United States Patent Office 2,822,778
Patented Feb. 11, 1958

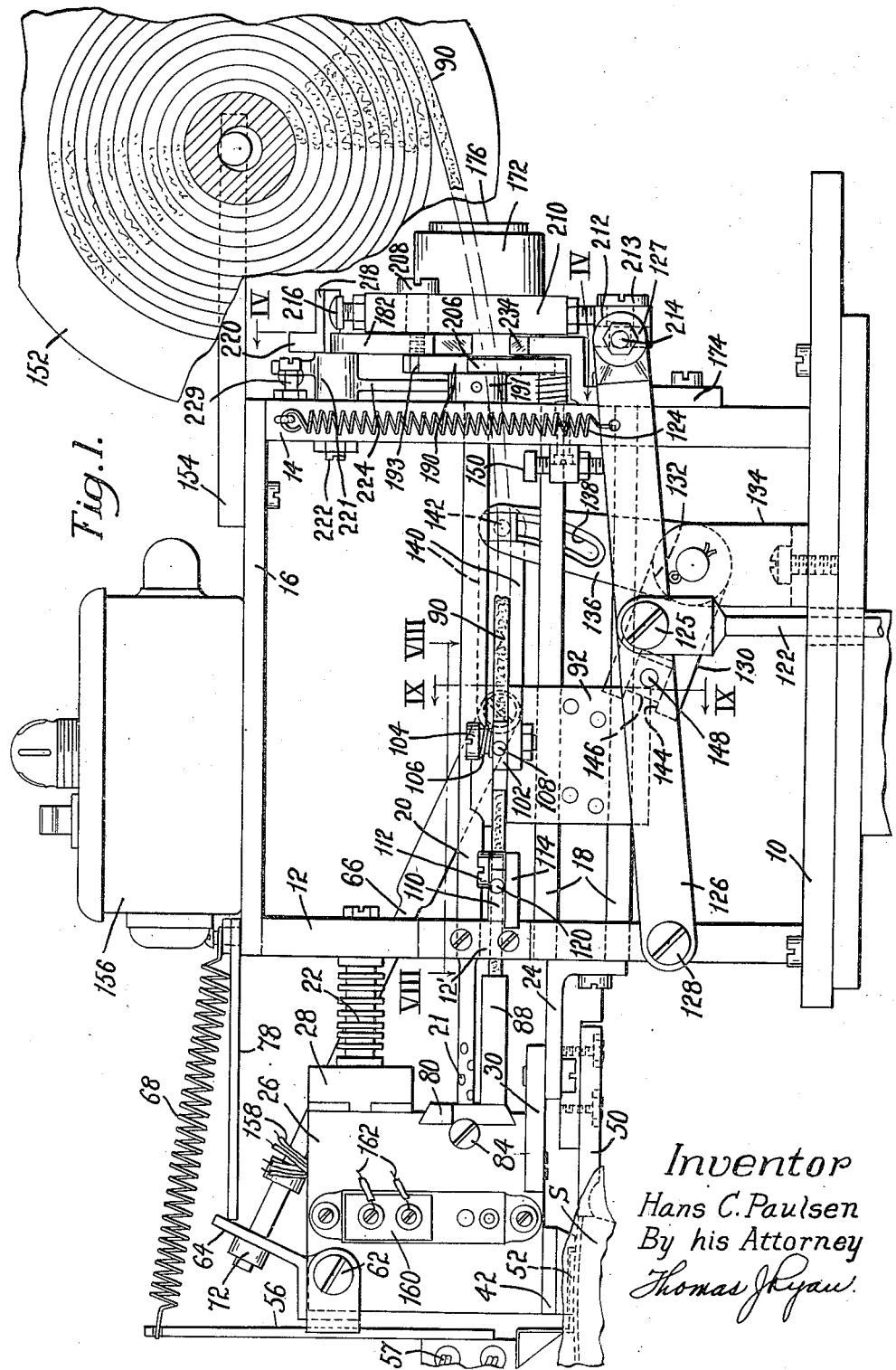

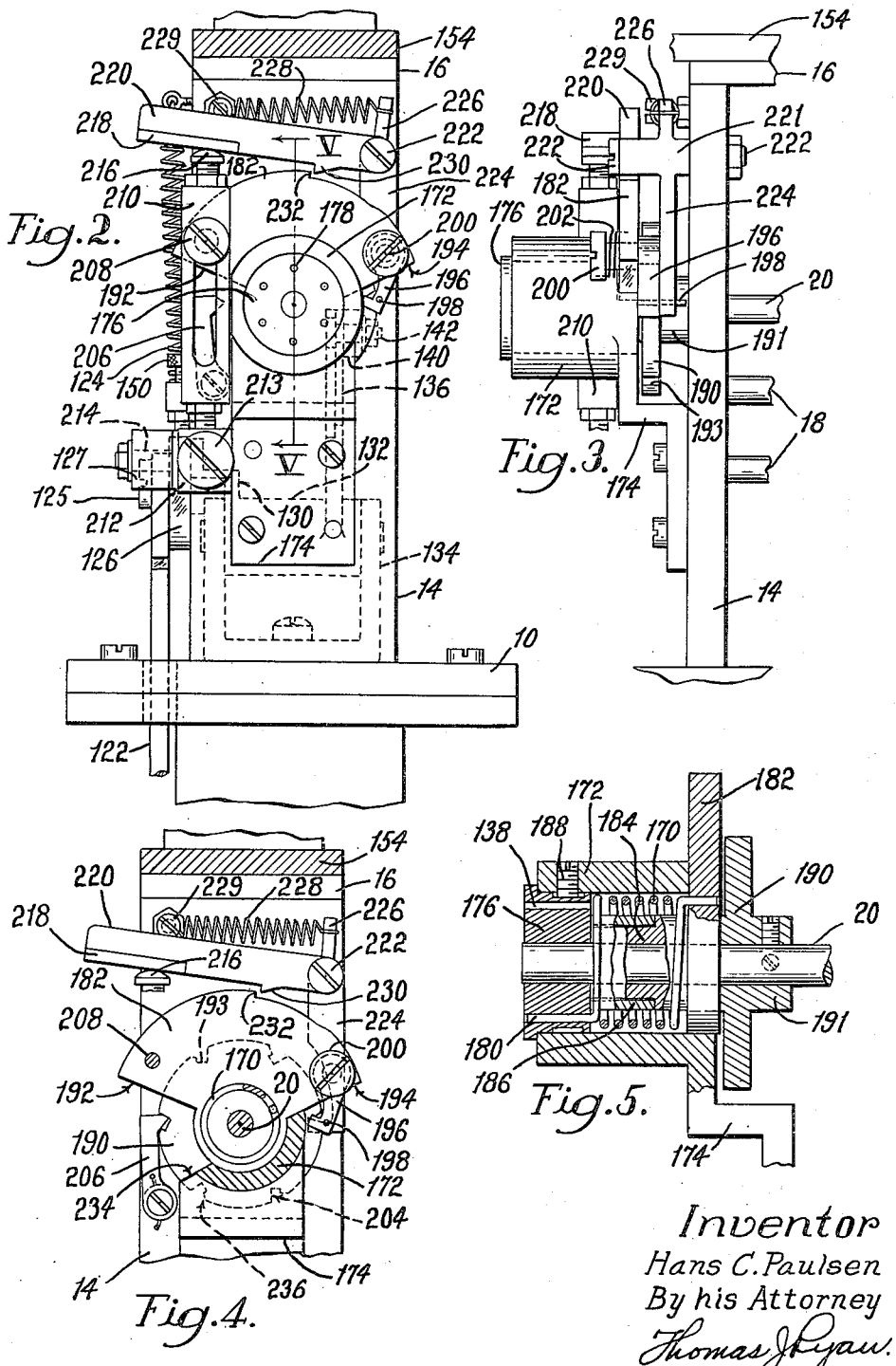

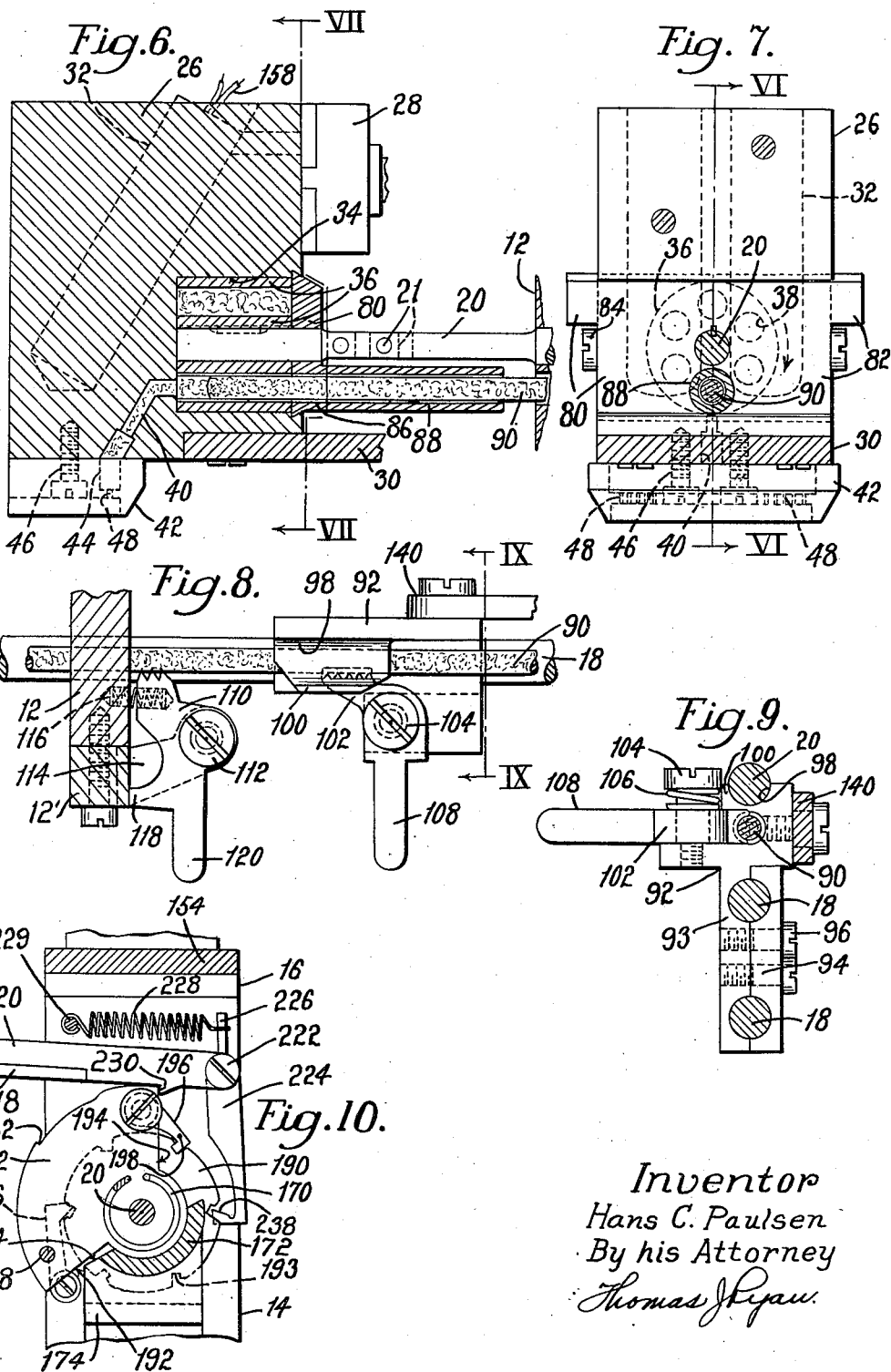

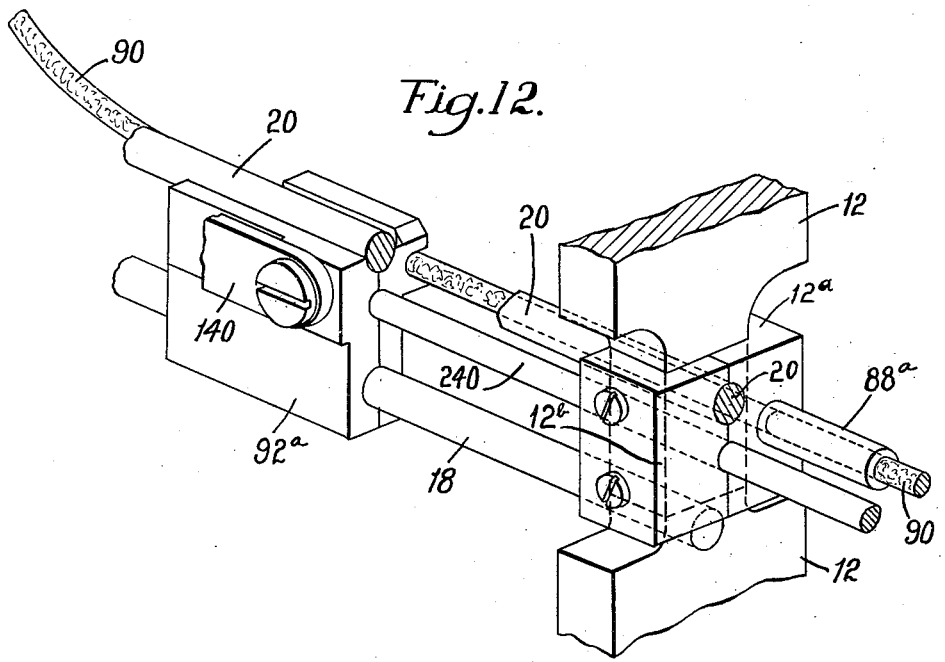
*Fig.12.*
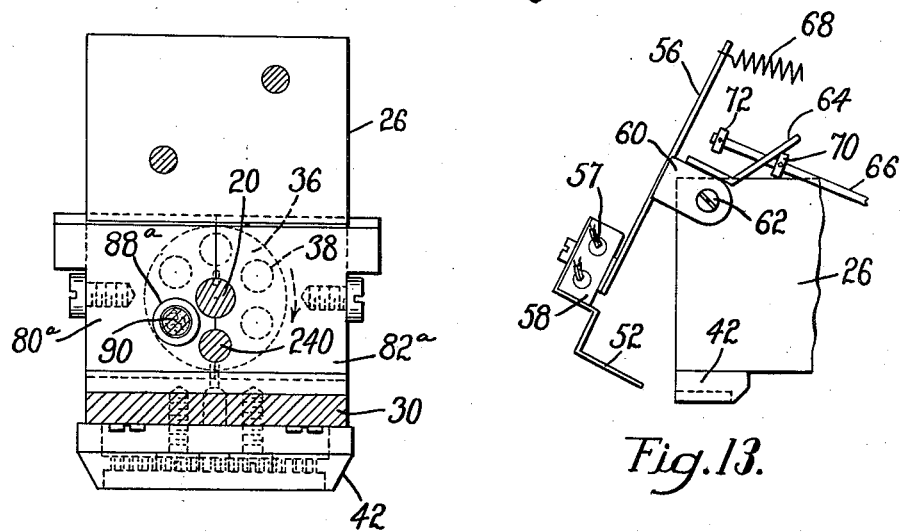
*Fig.11.*
*Fig.13.*
Inventor
Hans C. Paulsen
By his Attorney
Thomas J Ryan.

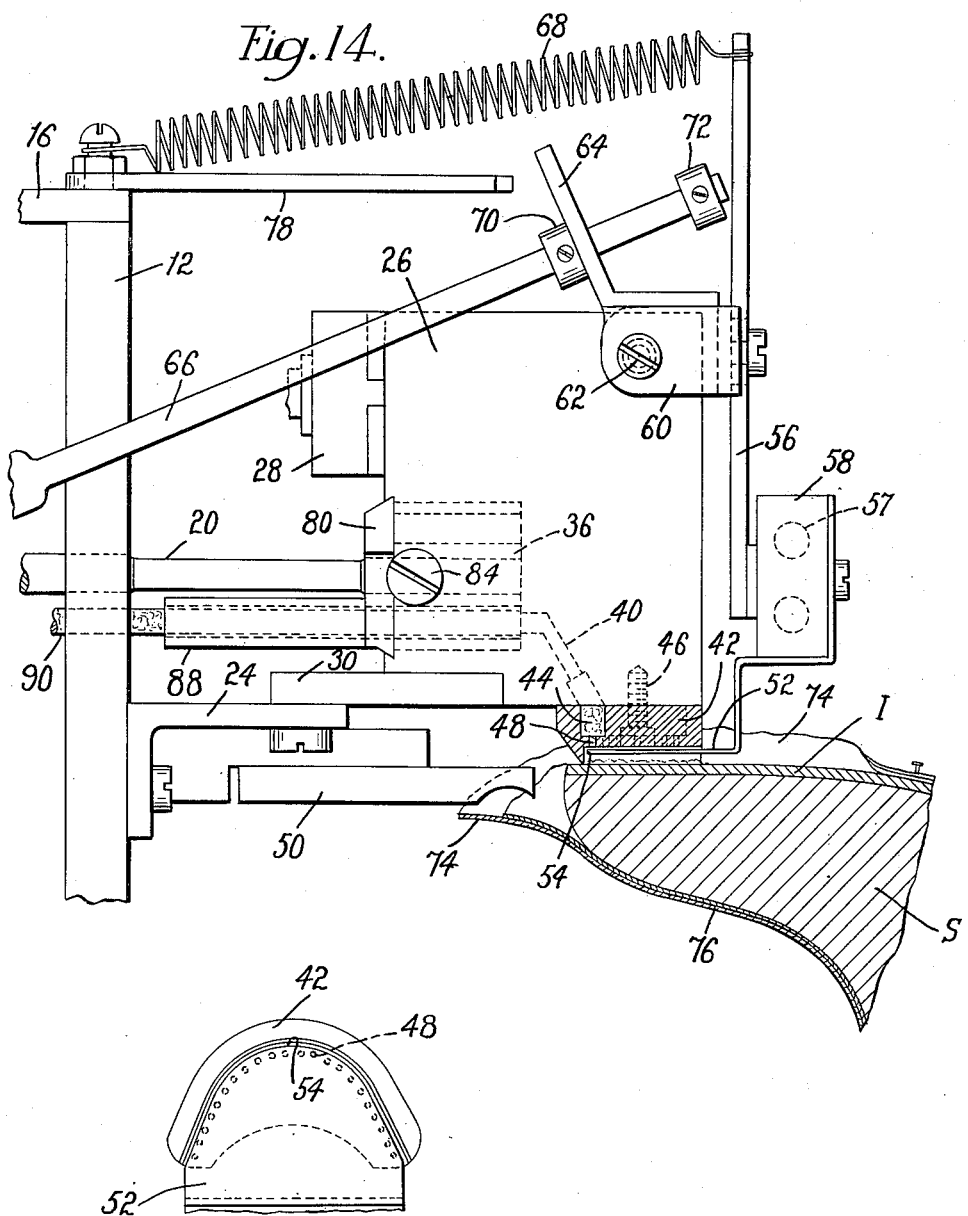

2,822,778

COATING MACHINE HAVING MEANS FOR MELT-
ING AND EJECTING CHARGES OF THERMO-
PLASTIC CEMENT

Hans C. Paulsen, Medford, Mass., assignor to United
Shoe Machinery Corporation, Flemington, N. J., a
corporation of New Jersey Application March 23, 1954, Serial No. 418,075

18 Claims. (Cl. 118—410)

This invention relates to apparatus for melting and ejecting charges of thermoplastic cement. It is herein illustrated in an apparatus to which the cement is furnished in rod form and it has a treadle-operated mechanism for feeding the rod, melting the charge, and ejecting the molten cement upon the work.

Although thermoplastic cements are known to have advantages in the strength of bond which can be obtained, and with respect to their quick drying properties, they have not been utilized extensively because of the difficulty in applying heat to melt the cement and in handling it for application to the work.

The melting of thermoplastic cement is difficult because of the considerable temperatures which are required and it is well understood that when a receptacle or pot is used for the melting operation difficulties are introduced because of the possibility of deterioration of the cement if it is heated and reheated for long periods. When this happens there comes the problem of cleaning out the receptacle before a new charge is heated. Furthermore, considerable of the operator's time is lost when starting work because of the delay in melting the substantial quantity of cement contained within the receptacle. Many of these troubles have been alleviated by the use of thermoplastic cement in rod form because it enables the quantity to be so readily determined by the length of the portion of the rod utilized and because it permits the progressive heating of the material. After melting it is substantially immediately delivered to the work.

There are opportunities for the utilization of this type of cement where it is desired to eject a single charge of the cement directly upon the work and where there is no regularity in the presentation of pieces of work.

Accordingly, it is an object of the invention to provide an improved melting and ejecting device which can be operator-controlled and in which an improved mechanism is provided for melting small quantities of the cement progressively.

If, for example, the rod cement is to be passed through a heating device at irregular intervals as required by the operator, then it is difficult to apply sufficient heat to melt the cement promptly or else to avoid overheating. Accordingly, it is another object of the invention to provide an improved melting device which, as herein illustrated, comprises a heated traveling carrier to which successive charges of cement are delivered and by which they are moved along to a point where the melting has been completed and the cement readied for ejection upon the work when the operator needs it.

Preferably, and as shown, this progressive melting device comprises a multichambered rotor within a heating mechanism and each time that the operator ejects a melted charge on the work he adds a new charge to one of the chambers. This may be done either by causing the in-fed cold rod of cement to eject the charge from one of the chambers and at the same time to fill the chamber with fresh cement or it can be done by providing an ejecting plunger upon the rod feeding mechanism. The ejection then will take place from one of the chambers while the fresh cement is delivered to another previously emptied chamber.

The stepping forward of this carrier for the charges of cement is effected, in accordance with a feature of the invention, by an improved indexing mechanism which is energized during the feeding of the rod and which is released to cause the turning movement at the completion of the feeding operation when the feeding device returns to its original position.

In view of the sticky and stringy nature of such cements, the apparatus is provided, in accordance with still another feature of the invention, with a string breaker swingably mounted adjacent to the nozzle and moved in, just before the work is removed, to a position where it cuts any strings forming between the nozzle and the work.

These and other features of the invention will best be understood from a consideration of the following specification, taken in connection with the accompanying drawings, in which Fig. 1 is a side elevation of the whole apparatus;

Fig. 2 is an end elevation taken from the right of Fig. 1;

Fig. 3 is a partial elevation looking at the far side of an indexing mechanism shown in Fig. 1;

Fig. 4 is a fragmentary vertical section through the indexing mechanism on the line IV—IV of Fig. 1;

Fig. 5 is another section taken on the line V—V of Fig. 2 through the casing containing the indexing spring;

Fig. 6 is a vertical longitudinal section on the line VI—VI of Fig. 7 through the nozzle-supporting container block within which the cement is melted;

Fig. 7 is a transverse section partly in elevation on the line VII—VII of Fig. 6;

Fig. 8 is a fragmentary horizontal section on the line VIII—VIII of Fig. 1, but on a larger scale, looking down upon the cement-feed slide;

Fig. 9 is a vertical section on the line IX—IX of Figs. 1 and 8 looking at the right end of this slide;

Fig. 10 is a view similar to that of Fig. 4 but showing the parts in another position;

Fig. 11 is a view similar to Fig. 7 but showing a modified form of the cement-ejecting device;

Fig. 12 is a fragmentary angular view of the modified cement-feed mechanism when provided with the ejecting plunger of Fig. 11;

Fig. 13 is a fragmentary view, showing the left end of the apparatus of Fig. 1, but with the string breaker pulled aside, ready for the presentation of a shoe;

Fig. 14 is a side elevation on an enlarged scale showing a nozzle-closing string-breaker plate which has been moved into the position shown at the completion of the ejection of cement on the shoe; and Fig. 15 is a bottom view of the nozzle showing the relation of the aforesaid plate thereto when in its innermost position.

The apparatus as it is herein illustrated includes a treadle-operated mechanism for extruding fixed charges of molten adhesive and, in order that the operation may be repeated, at short intervals, without having to wait for each fresh charge of the thermoplastic adhesive to melt, it is provided with a rotatable charge-holder or carrier having a series of charge-holding chambers to which heat is applied. The cold adhesive inserted in one of these chambers is carried around, step-by-step, until it is removed at or near the end of one revolution, thus increasing the time during which the adhesive may be heated, to melt it completely.

As illustrated, the working parts of the apparatus are mounted upon a frame having a base 10, a forward end plate 12, a rear end plate 14 and a top piece 16. The mid portion of the end plate 12 is cut away at the front, leaving a gap filled by a block 12' held in place by screws (Fig. 1). Extending between the end plates are guide rods 18 and in the plates there is journaled a shaft 20. On the forward end plate 12 there is supported, by means of brackets 22 and 24, a heated container 26 which is connected to the brackets by insulating blocks 28 and 30 to help avoid a transfer of heat to the working mechanism. Ventilating holes 21 in the shaft 20 serve a similar purpose. This container 26, which is here shown as a solid block in order to gain the advantage of storage of heat supplied by electric units such as that shown at 32, is provided with a recess 34 (Fig. 6) containing a carrier in the form of a chambered rotor 36 which is keyed to the end of the shaft 20 and is provided with a series of axially arranged chambers 38 (Fig. 7) which are here shown as cylindrical and parallel to the axis of the shaft 20.

Six of these chambers are equally spaced around the shaft and the ends of the chambers are closed by the material forming the recess. In the illustrated container, a transfer of heat to the rotor is facilitated by making the heater container touch the periphery of the rotor. The container block 26 is provided with an outlet passage 40 (Fig. 6) connected to a nozzle 42 which in the arrangement herein illustrated is horeshoe-shaped (Fig. 15) to fit the toe end of a shoe in order that the apparatus may be used to deposit cement, for lasting, upon the end margin of an insole. In other uses of the device, it may not be necessary to use a nozzle and the melted cement may even be drained by gravity from one chamber. For toe lasting, however, the nozzle piece has a substantially horseshoe-shaped groove 44 (Fig. 6) around its curved margin. The top of this groove is closed by the container block 26 to which the nozzle is gripped tightly by means of attaching screws 46 but the groove registers with the outlet passage 40 so that melted cement delivered thereto will spread around the periphery of the nozzle and be extruded through a series of vertical holes 48, (Figs. 6 and 15) A shoe S held in inverted position is located with respect to the nozzle by pressing it against an end gauge 50 as shown in Fig. 1.

In view of the sticky, stringy nature of the cement there is a tendency for the formation of strings between the nozzle and the work as the shoe is removed from the nozzle. To counteract this tendency, a heated closure plate 52 (Figs. 1, 13, 14, and 15) having a horseshoe-shaped periphery 54 may be pushed close to the nozzle to close the various outlet openings 48 after the ejection has taken place.

The plate 52 is carried by an upright bar 56 and is provided with heating units 57 in a block 58. The bar 56 has outwardly projecting ears 60 by means of which the unit is mounted upon pivot screws 62 received in the container block 26. The ears 60 support an arm 64 apertured to receive a rod 66 attached to a cement feed slide 92 and hence, as will later appear, the rod 66 is in effect a lost-motion connection to an operating treadle (not shown). On this rod 66 there are mounted a collar 70 inside of the arm 64 and a stop collar 72 to avoid accidental disconnection of the rod and the arm and to determine the displaced position of the closure plate 52. A spring 68 between the frame and the bar 56 tends to draw the closure plate 52 away from the nozzle, as shown in Fig. 13, to permit the extrusion of cement. A pivoted locking plate 78 holds the closure plate in against the nozzle (Fig. 1) when the whole device is idle but is turned away, as shown in Fig. 14, when the work is to be presented.

The outer or right side of the recess 34 (Fig. 6) in the heated container block 26 is closed by a pair of plates 80, 82 (Fig. 7), having a dovetail fit in the block 26 and retained therein by means of screws 84 (Fig. 1). The plate 80 is provided with an entrance passage 86 extended outwardly by means of an inlet tube 88 by which there is guided an elongated rod 90 of thermoplastic cement. The tube is split longitudinally and half of it is attached to each plate 80, 82.

A cold solid cement rod is pushed into the entrance by a rod feeding mechanism to be described and thence into the alined chamber of the rotor 36 where it displaces therefrom the previously melted cement contained by that particular chamber, assuming that the rotor has previously been turned at least a single revolution. This melted cement flows through the registering outlet 40 and thence through the holes 48 in the nozzle. Following this rod-feeding action, as will later be explained, the shaft 20 is turned one-sixth of a revolution to cut off the rod at the line of contact between the plate 80 and the end of the rotor.

For the purpose of repeatedly charging the successive chambers, as by feeding a portion of this cement rod 90 to the rotor 36, the apparatus is provided with a mechanism shown in Figs. 1, 8 and 9 and this comprises a feed slide 92 movable along the guide rods 18 of the frame. The slide is made up of a T-shaped plate 93 which is grooved to receive the rods 18 and is combined with a plate 94 also grooved and held to the first plate by screws 96. An additional support and guidance for this slide is provided by making a semi-circular groove 98 in the T-shaped top of the slide to receive the lower half of the drive shaft 20. The slide has an overhanging portion 100 forming a lateral recess to receive the cement rod 90.

Gripping the rod in this recess is a pawl 102 mounted upon the slide for rotation about a vertical screw 104 by means of a coil spring 106 located beneath its head. This pawl is provided with a finger piece or handle 108. As the slide 92 moves to the left, the pawl 102 will grip the rod and carry it along but when the slide moves to the right this spring allows the pawl to drag over the surface of the rod. Assurance against any backward movement of the rod, because of the friction between the pawl and the rod, is given by a holding pawl 110 mounted on a vertical screw 112 in a horizontally extending bracket 114 which is notched in and welded to the fill-in block 12' attached to the forward end frame 12. A spring 116, between this end frame and a recess in the pawl, urges it in a clockwise direction as seen in Fig. 8 until a tail 118 on the pawl contacts the bracket. This holding pawl is also provided with a finger piece 120. As noted above, this feeding mechanism has also the function of an ejecting mechanism for the molten cement.

Inasmuch as the apparatus is only intended to be used intermittently as pieces of work are presented to it, it has been arranged to be cycled by the depression of a treadle (not shown) connected to a treadle rod 122 (Fig. 1) which is normally held in elevated position by means of a spring 124. This treadle rod is connected by a screw 125 to a long, straight lever 126 swinging about a pivot screw 128 in the forward end frame 12 and having, at its other end, a thickened, rounded end 127 (Figs. 1 and 2). The lever is connected to a short arm 130 of a bell crank having a hub 132 journaled in a U-shaped bracket 134 which is attached to the base 10 of the frame.

Integral with the hub 132 of the bell crank is a long arm 136 having an arcuate slot 138 to enable it to be adjustably connected to the slide 92 by means of a link 140 pivoted on the slide and having a pivoted connection to a bolt 142 adapted to be clamped to the slotted arm 136 in a position determined by the length of feed desired. The short arm 130, as may be seen in Fig. 2, is bent laterally and its outer end is forked at 144 (Fig. 1) to receive a block 146 rotatable upon a pivot screw 148 which is threaded in the lever 126. The limit of upward movement of the lever 126 is determined by a stop screw 150.

Conveniently, a supply of the rod cement 90 may be coiled upon a reel 152 which is freely rotatable upon a stud attached to the end of a bracket 154 mounted upon the top piece 16 of the frame. Upon this top piece there is also positioned a junction box 156 adapted to be connected to a source of power and to the terminals 158 of the heating units 32. A thermostat 160 has terminals for attaching conductors 162 which are also carried back to the junction box 156.

An intermittent rotation of the shaft 20 to which the chambered rotor 36 is attached is effected by an indexing device carried on the right end of the frame and operated by the power of a helical spring 170 (Fig. 5) contained within a casing 172 which is supported upon the end frame 14 by means of a bracket 174 integral with the casing. A bearing block 176 for the shaft 20 serves as a closure for the outer end of the casing 172 and is provided with a series of apertures 178 (Fig. 2) in any one of which there is received an out-turned end 180 of the spring.

At the other end of the casing is a segment 182 having a hub 184 which extends through the spring 170 and abuts the bearing block 176. Surrounding a portion of this hub is a loose sleeve 186 so that the coils of the spring may not unduly bind the hub and prevent free rotation of the segment 182. It will be understood that the spring is preloaded, during assembly, by positioning the block 176 to wind up the spring and then holding it by means of a set screw 188 which is threaded in the casing.

The degree of preloading may be enough to enable the spring to do its required work for several cycles of the cement-applying device, but it eventually must be rewound and provision is made for partially winding it at each cycle. To this end, the other end of the spring is engaged with the segment 182 and the latter is held against axial movement on the shaft by engagement of the hub 191 (Fig. 5) of a ratchet plate 190 which is held on the shaft by set screws and has notches 103 (Fig. 4).

As may be seen from an inspection of Figs. 2, 4 and 10, the segment 182 has an enlarged portion extending from a radius 192 (Fig. 4) to a radius 194. Back of the segment is pivotally supported a driving pawl 196, for the ratchet, which pawl has a transverse pin 198 for a purpose to be later described. This pawl is mounted upon a screw stud 200 around which there is a coil spring 202 (Fig. 3) urging the pawl toward the periphery of the ratchet 190. This pawl 196 has a squared end, the outer side of which is adapted to rest against flat sides 204 (Fig. 4) of the notches 193 in the periphery of the ratchet 190 and to push the ratchet around when the segment 182 is turned clockwise, as viewed in Figs. 2 and 4. A holding pawl 206, mounted on the end frame 14, is spring-pressed against the ratchet and prevents retrograde movement thereof.

A stud 208 attached to the segment near its radius 192 is slidable in the slot of a vertical bar 210. The lower end of this bar 210 has threaded in it an upward extension of a block 212 forming part of a universal joint between the outer end 127 of the long treadle-operated lever 126 and the vertical bar 210. To this end, an intermediate block has a lateral stud 214 capable of pivoting in the end 127. This block has a screw stud 213 which is rotatable in the block 212 about an axis at right angles to that of the lateral stud 214.

At the top of the slotted bar 210 is an adjustable abutment 216 which is arranged to coact with a lip 218 projecting outwardly from a latch 220. This latch, with its hub 221 (Figs. 1 and 3) pivotally supported on the frame by means of a screw 222, has an integral downwardly extending arm 224 the lower end of which is notched in a peculiar fashion best shown in Fig. 10 to enable it to cooperate with the pin 198 upon the advancing pawl 196. The hub 221 of the latch 220 has an upstanding pin 226 to which there is attached a spring 228 urging the latch in a counterclockwise direction as viewed in Figs. 2, 4, and 10 to urge a projection 230 thereon toward the periphery of the segment 182.

The other end of the spring is secured to a screw 229 in the end plate 14. The periphery of the segment is cut down to a slightly smaller radius beyond a shoulder 232 to leave ample space for the latch 220. It will be noted from Figs. 1 and 10 that the bracket 174 on the casing 172 is provided with an integral shoulder 234 positioned to coact with the radius 192 upon the segment to limit the counterclockwise movement thereof when the treadle is depressed.

In general, the indexing mechanism is arranged so that upon depression of the treadle attached to the treadle rod 122 the segment 182 is given an oscillation equivalent to about one-sixth of a revolution, thereby increasing the tension of the helical spring 170 and carrying the segment to the position shown in Fig. 10 where the projection 230 of the latch 220 has engaged the radius 194 upon the segment.

In this movement the advancing pawl 196 has dragged over the surface of the ratchet without moving it, because of the holding pawl 206. It will be remembered that the treadle movement has accomplished a reciprocatory movement of the slide 92 and consequently a feeding of the cement rod 90 into one of the chambers of the rotor 36. The treadle is then released and raised by the spring 124. This movement will cause the slotted bar 210 to be raised without disturbing the segment, because of the slot in the bar 210 which allows it to move upwardly with respect to the screw 208 on the segment, until the abutment 216 at the top of the bar lifts the latch 220 and allows the spring to rotate the segment clockwise, pushing the ratchet and hence the shaft 20 and the attached rotor 36 around with it for one-sixth of a revolution.

During the spring-energizing movement of the segment, the advancing pawl 196 will be free to drag over the surface of the ratchet because it has been withdrawn from the square portion of the notch in the ratchet far enough to permit it to be completely disengaged by riding over a cut back surface 236 (Fig. 4) of each notch. This withdrawal of the pawl 196 is effected by a hook surface 238 (Fig. 10) upon the arm 224 hanging down from, and integral with the latch 220, just as the latch 220 drops into the cut-away portion of the periphery of the segment which lies to the right of the shoulder 232. The surface 238 acts upon the pin 198 of the pawl and cams it out far enough to hit only the cut back surface 236 of the notch 193 where it is when the segment is moved counterclockwise and then to drop into the next succeeding notch.

Consequently, when the treadle is released the ascending slotted bar tilts the latch 220 to allow the segment, which has been rotated to the left to the position shown in Fig. 10, to rotate clockwise, whereupon the advancing pawl 196, having dropped into the next notch, will push the ratchet along with the segment for a sixth of a revolution thus indexing the rotor 36.

Under some conditions, it is more desirable to provide a modified structure shown in Figs. 11 and 12 thereby to effect an ejection of a melted charge through the outlet 40 and the nozzle 42 by the push of a plunger 240 which is mounted upon a slide 92a in parallel relation to and directly below the shaft 20 and is so arranged that it will enter the lowermost rotor chamber i. e., the one to which the cement rod 90 is fed, in the arrangement shown in Figs. 1, 6 and 7. The slide 92a is thickened to bring forward (i. e. to the left in Fig. 9) the recess for the cement rod and the coacting gripping pawl 102. In this modified arrangement, blocks 12a and 12b are applied to a reduced midportion of the end plate 12 (Figs. 1 and 14) to retain within them a wiper (not shown) for the plunger 240. An inlet tube 88a, here mounted on the block 12a, receives the cement rod emerging from a suitable passage in the block 12a and guides it into that rotor chamber 38 just emptied by the rod 240 and which has moved clockwise therefrom (Fig. 11).

With this arrangement every operation of the treadle is effective to cause the slide 92a to feed rod cement 90 through the inlet tube 88a and through a closure plate 80a into one of the chambers (Fig. 11) of the rotor and simultaneouly to cause the plunger 240 to eject the cement from the next adjacent chamber, reading in a counter-clockwise direction. This latter chamber is at the bottom of rotor 36 and the plunger 240 passes through an opening at the adjacent edges of closure plates 80a and 82a.

Whenever the operator wishes to apply cement to a shoe, he will position the shoe beneath the nozzle with the string breaker 52 moved aside in the relation shown in Fig. 13 and will depress the treadle thereby causing a feeding movement of the cement rod and an ejection of cement through the nozzle. Obviously it is not desirable for the rotor to be moved during this reciprocatory movement and consequently the indexing device is so arranged that the depression of the treadle causes only the movement of the segment 182 to additionally tension the helical spring.

The operator will then release the treadle to the spring 124 thereby to lift the latch 220 and allow the helical spring 170 to move the segment clockwise and to carry with it the ratchet 190 which is attached to the shaft 20. This will cause a partial rotation of the rotor 36 (clockwise in Fig. 7) to sever the rod of cement and bring a previously inserted charge into position for ejection, it being understood that the prior operations of the apparatus have filled the chambers of the rotor and allowed the cement delivered to the rotor at one point to have traveled through such a portion of the arc of movement of the rotor as to allow the heat provided by the heating units 32 to have melted at least the most advanced one of the cement charges therein.

This general operation is essentially the same whether the preferred construction or the modified construction of Figs. 11 and 12 is employed. The depression of the treadle will also be effective to move the string breaker 52 inward to the position shown in Fig. 14 so that, as the operator withdraws the shoe horizontally, wiping a portion of the cement upon the lasting margin of the upper, the plate 52 will have severed any strings forming between the nozzle and the work. Due to the lost-motion connection provided by the rod 66 and its collars, the ejection of cement will be completed before the string breaker plate 52 reaches a position where it closes the nozzle openings.

Having thus described my invention, what I claim as new and desire to secure by Letters Patent of the United States is:

1. In a cement-applying apparatus for extruding measured amounts of melted thermoplastic cement, a melting device comprising a heater and a carrier rotatable therein, said device having an outlet communicating with said carrier, a feeding device movable to deliver discrete charges intermittently to the carrier, means for moving the feeding device, means connected with the feeding device for moving the carrier step by step a fraction of a turn at a time, and means for ejecting a melted charge from the carrier through the outlet.

2. In a cement-applying apparatus for extruding measured amounts of melted thermoplastic cement, a melting device comprising a heater and a carrier, an outlet communicating with said carrier, a feeding device movable in a fixed path to charge the carrier, means for adjustably determining the length of said path, means connected with the feeding device for moving the carrier step by step, and means for ejecting a melted charge therefrom through the outlet.

3. In a cement-applying apparatus, a heated block, a rotor in said block having a circumferential series of axially extending chambers, said block having a passage adapted to register with one of said chambers and terminating in an outlet, means for filling a chamber in said block with solid cementitious material, means for turning said rotor, and means for ejecting said material axially from said chamber and through said passage after the rotor has been turned and the material has melted.

4. In a cement-applying apparatus, a rotor having a plurality of passages parallel to its axis, an outlet connected to one of said passages, means for heating the rotor, and means for feeding thermoplastic rod cement into and along a passage extending in a direction parallel to the axis of the rotor, cutting off the rod, melting the cement, and ejecting the melted cement through the outlet.

5. In a cement-applying apparatus, a block having a recess, a rotor in said recess having a plurality of elongated passages with complete side walls extending parallel to its axis, a closure plate containing an inlet passage mounted close to an end of the rotor with its inlet passage adapted to register with one of the passages in the rotor, means for feeding rod cement through said plate into a passage of the rotor axially thereof, means for turning the rotor to cut off said rod, and means for heating the block to melt the cement in the rotor, said block having an outlet passage adapted to register with one of the passages in the rotor.

6. In a cement-applying apparatus, a heated block having a recess, a rotor mounted in said recess having a plurality of axially extending chambers open at both ends, said block having an outlet passage registering with one end of a chamber in the rotor, and means for supplying a fresh piece of cold, solid cement through the other end of that chamber which registers with the outlet passage, thereby simultaneously removing a charge of melted cement axially from the rotor and through the outlet passage in the block as the fresh piece replaces it.

7. In a cement-applying apparatus, a heated block having a cylindrical recess, said block having an outlet passage communicating with one end of the recess and an inlet passage alined with the first passage and communicating with the other end of the recess, a rotor in said recess having a series of chambers adapted to be brought seriatim between and into register with and connecting said outlet and inlet passages, and reciprocatory means for delivering a charge of cold, solid cement through the inlet to one of the chambers in the rotor and thereby extruding the melted cement in that chamber through the outlet passage.

8. In a cement-applying apparatus, a heated block having a recess, a multichambered rotor mounted in said recess for rotation therein, the ends of said rotor fitting the ends of the recess, said block having inlet and outlet passages in alinement with one another and connecting with opposite ends of the recess, reciprocatory means for charging successive chambers in said rotor and simultaneously extruding the melted cement contained therein through the outlet passage, and means for imparting step by step rotation to the rotor during the intervals between the reciprocatory feeding movements.

9. In a cement-applying apparatus, a heated block having a recess, a multichambered rotor rotatably mounted in said recess with its end portions fitting the end portions of the recess, said block having inlet and outlet passages communicating with opposite ends of the recess, means for feeding solid thermoplastic cement through the inlet passage to one of the chambers, thereby simultaneously ejecting melted cement from that chamber, and means for imparting step by step rotation to the rotor during the intervals between the feeding operations.

10. In a cement-applying apparatus, a rotor having a series of chambers parallel to the axis of the rotor, a heated container for the rotor closing the ends of said chambers and provided with an inlet passage in alinement with one end of one of the chambers of the rotor, said container having an outlet passage in alinement with the other end of the same passage in the rotor and with one of the passages therein to receive melted cement from said chamber, means for feeding cold, solid thermoplastic cement through said inlet passage intermittently, and means mechanically connected to said feeding means for turning said rotor to bring the next chamber opposite to the inlet passage.

11. In a cement applying apparatus, a nozzle having nozzle openings, means for extruding a sticky thermoplastic cement through said nozzle, a plate in front of said nozzle supported for movement laterally with respect to said nozzle openings, a spring for moving the plate out of a position adjacent to the nozzle, and a lock for holding the plate in nozzle-closing position.

12. In a cement applying apparatus, a nozzle having an outlet opening at its lower end, a closure plate for said outlet opening pivotally mounted for lateral movement to uncover the opening, means for heating said plate, and means for pushing said plate into position between the nozzle and a piece of work presented thereto thereby to sever any strings of cement forming between the nozzle opening and the work.

13. In a cement applying apparatus, a nozzle having an outlet opening to which a piece of work may be presented, a plate adapted to be interposed between the nozzle and the work, means for supporting said plate for lateral movement away from the nozzle, means for ejecting cement through the nozzle and lost-motion means connected to the ejecting means for bringing said plate into position between the nozzle and the work substantially at the end of the ejection operation.

14. In a cement applying apparatus, a nozzle having a plurality of openings at its lower end to which a piece of work may be presented, a closure plate shaped to cover said openings, a swinging mount for said plate, a spring tending to move the plate away from the nozzle, a treadle-operated reciprocable device for ejecting cement through the nozzle, and a lost-motion connection between said treadle-operated device and the swinging mount constructed and arranged to move the closure plate into position between the nozzle and the work after the movement for ejection of cement has been substantially completed.

15. In an apparatus for extruding charges of thermoplastic cement, a container having an outlet, a rotor, provided with a plurality of evenly spaced chambers, rotatably mounted in said container, said container fitting against and closing the opposite ends of the chambers, an inlet passage registering with one of the chambers, reciprocatory means for feeding rod cement through said inlet passage into a chamber, indexing means for turning the rotor to bring successive chambers into register with the inlet passage, a plunger associated with said rod feeding means and slidable into said container in register with another of said chambers which is alined with the outlet, and means for operating the rod feeding means to carry a charge of solid cement through the inlet passage and simultaneously to cause the plunger to eject a melted charge through the outlet.

16. In an apparatus for extruding thermoplastic cement, a container having an outlet, a multichambered rotor rotatably mounted in said container, an indexing device for turning the rotor part of a revolution at a time to bring successive chambers into position opposite the outlet, reciprocatory means for charging successive chambers of the rotor, a spring for operating the indexing device, and means interconnected with the reciprocatory charging means for energizing said spring during charging movements and for releasing said spring to cause a partial rotation of the rotor during the intervals between charging movements.

17. In a cement-applying apparatus, a frame, a shaft rotatable in said frame, a rotor on the shaft having equally spaced chambers therein, an outlet passage adapted to be connected with the outlet end of a chamber in the rotor, means for heating the rotor to melt the cement therein, an inlet adapted to be connected to successive chambers of the rotor, treadle-operated reciprocatory means for delivering charges of cement through said inlet to said chambers, a spring-loaded segment rotatable upon said shaft, a lost-motion connection between the treadle and the segment, means for releasably connecting the segment of the shaft, and a latch for the segment positioned for release by said lost-motion connection upon the completion of the charging cycle, thereby permitting said segment to turn said shaft a fraction of a rotation equal to the spacing between successive chambers.

18. In a cement-applying apparatus, a multichambered cement treating rotor, an indexing device for said rotor comprising a ratchet secured thereto, which ratchet is notched in register with the chambers of the rotor, a spring-loaded segment capable of oscillation with respect to the ratchet and having a pawl associated with the ratchet, lost-motion reciprocatory means for imparting a partial rotation to the segment, and a latch for holding the segment against said spring during part of the return movement of the reciprocatory means, said latch being positioned for disengagement from the segment by the reciprocatory means thereby to release the segment when the reciprocatory means returns to its starting position at the completion of a cycle.

References Cited in the file of this patent

UNITED STATES PATENTS

| | | |
|---|---|---|
| 2,414,181 | Vandersee | Jan. 14, 1947 |
| 2,522,526 | Manning | Sept. 19, 1950 |
| 2,522,527 | Manning | Sept. 19, 1950 |
| 2,567,960 | Myers et al. | Sept. 18, 1951 |
| 2,579,967 | Ruau | Dec. 25, 1951 |
| 2,673,121 | Brennan | Mar. 23, 1954 |
| 2,700,260 | Paulsen | Jan. 25, 1955 |
| 2,708,278 | Kamborian | May 17, 1955 |
| 2,726,629 | Paulsen | Dec. 13, 1955 |